(12) United States Patent
Imai et al.

(10) Patent No.: US 7,548,351 B2
(45) Date of Patent: Jun. 16, 2009

(54) IMAGE READING DEVICE AND IMAGE FORMING APPARATUS

(75) Inventors: Yusuke Imai, Toride (JP); Toshifumi Itabashi, Toride (JP); Kiyoshi Oyama, Tokyo (JP); Takuma Koizumi, Toride (JP); Ayumu Murakami, Abiko (JP); Yuichi Yamamoto, Toride (JP); Haruhisa Oshida, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 252 days.

(21) Appl. No.: 11/614,285

(22) Filed: Dec. 21, 2006

(65) Prior Publication Data

US 2007/0146824 A1    Jun. 28, 2007

(30) Foreign Application Priority Data

Dec. 27, 2005    (JP)    ............... 2005-376415

(51) Int. Cl.
*H04N 1/04*    (2006.01)
(52) U.S. Cl. ............... 358/474; 358/497; 358/482; 358/496
(58) Field of Classification Search ............... 358/473, 358/472, 497, 496, 483, 482, 505, 512–514, 358/498; 250/214.1, 208.1, 239, 216; 355/25, 355/82; 399/362
See application file for complete search history.

(56) References Cited

U.S. PATENT DOCUMENTS

| | | | | | |
|---|---|---|---|---|---|
| 4,486,655 | A | * | 12/1984 | Kataoka | 250/214.1 |
| 5,140,442 | A | * | 8/1992 | Shigemura et al. | 358/473 |
| 5,377,022 | A | * | 12/1994 | Street et al. | 358/498 |
| 5,828,469 | A | * | 10/1998 | Kowalski et al. | 358/498 |
| 6,989,916 | B2 | * | 1/2006 | Lichtfuss | 358/474 |
| 7,236,274 | B2 | * | 6/2007 | Sheng et al. | 358/504 |

FOREIGN PATENT DOCUMENTS

| | | | |
|---|---|---|---|
| JP | 10-150534 A | | 6/1998 |
| JP | 2000-244729 A | | 9/2000 |
| JP | 2007-057975 A | * | 3/2007 |

* cited by examiner

*Primary Examiner*—Cheukfan Lee
(74) *Attorney, Agent, or Firm*—Rossi, Kimms & McDowell, LLP

(57) ABSTRACT

An image reading device which is capable of enhancing productivity in reading bound originals, such as a book, a magazine, or a document. A sheet-scanner device implementing the image reading device includes a sheet scanner as a reader part for reading an image on an original. The sheet scanner comprises a sheet-like substrate formed thereon with a light-emitting layer that can emit light spontaneously, and a light-receiving layer on which a plurality of reading pixels are arranged. The sheet scanner is mounted in the sheet-scanner device such that the sheet scanner can be drawn out onto and in from the original.

8 Claims, 8 Drawing Sheets

IMAGE READING DEVICE AND IMAGE FORMING APPARATUS

BACKGROUND OF THE INVENTION

1. Field of the Invention

The present invention relates to an image reading device having a reader part for reading an image on an original, and an image forming apparatus including the reading device.

2. Description of the Related Art

In general, a flat-bed scanner is used as an image reading device for an image forming apparatus. When the flat-bed scanner is used for scanning bound originals (hereinafter referred to as "a book-type original"), such as a book, a magazine, or a document, a spread central portion (hereinafter referred to as "the book center") of the book-type original is apt to be bent upward and rise from an original platen glass. For this reason, a portion of an image read from a book-type original which corresponds to the book center is often deformed, curved, or darkened. In a worse case, it is impossible to read an image from a book-type original.

To solve the problem, there has been proposed a technique for eliminating deformation of a read image in the sub scanning direction (see e.g. Japanese Laid-Open Patent Publication (Kokai) No. H10-150534). According to this technique, distances between a reader part and a surface of an original on an original platen glass are detected, a height distribution of a spread part of the original is calculated based on the detected distances, and then a reading pitch in the sub scanning direction is varied based on the calculated height distribution spread part during scanning of the original. Further, there has been disclosed a technique of accurately determining the size of an original by calculating a distance along the surface thereof in a spreading direction based on the height distribution of the spread part of the original.

There has been disclosed a still another technique of calculating heights of respective points on a book-type original from an original platen glass of a general-purpose flat-bed scanner, based on the shape of the contour line of an image read by the scanner, and then correcting the read image based on the calculated heights (see e.g. Japanese Laid-Open Patent Publication (Kokai) No. 2000-244729).

In the technique for eliminating deformation of a read image in the sub scanning direction, it is necessary to change the reading pitch of a reader part in the sub scanning direction according to the height of an original surface at each scanned position. Further, since the reader part is configured to read the original from above, a predetermined space is necessitated between an original platen glass and the reader part. For this reason, an image reading device using this technique is required to have a different system or configuration from that of a flat-bed scanner, which inevitably makes the device complicated and increases the size of the device. Therefore, in the case where the image reading device employing the technique is used as an image reading device for a copying machine, manufacturing costs become higher than in the case where a flat-bed scanner is used. In addition, a new space is required for installation of the device.

On the other hand, the technique of correcting a read image based on heights of respective points on a book-type original from an original platen glass is used for a flat-bed scanner, and hence in order to read an original, it is required to set the original on the original platen glass such that a surface of the original to be read faces downward. However, to turn pages of the book-type original, it is necessary to once set the book on the original platen glass such that the opened pages face upward, turn to a desired page, and then set the book again on the original platen such that the opened pages face downward. In short, whenever pages are read, the whole book-type original has to be turned over, which considerably reduces productivity in reading the book-type original.

Further, when the height of the book center exceeds a predetermined value, the reading depth of the reader part becomes larger than a readable depth, and hence image portions close to the book center cannot be read. As a consequence, the image portions in respective areas close to the book center are read as blackened images.

Furthermore, since a spread surface of a book-type original corresponding to two pages is read as one page, it is necessary to perform control for dividing the one page into two so as to copy the book-type original in accordance with its page layout.

SUMMARY OF THE INVENTION

It is an object of the present invention to provide an image reading device which is capable of enhancing productivity in reading bound originals, such as a book, a magazine, or a document, and an image forming apparatus including the image reading device.

To attain the above object, in a first aspect of the present invention, there is provided an image reading device having a reader part for reading an image on an original, wherein the reader part comprises a sheet-like substrate formed thereon with a light-emitting layer that can emit light spontaneously, and a light-receiving layer on which a plurality of optical sensors are arranged, the reader part being mounted in the image reading device such that the reader part can be moved to and from the original.

Preferably, the light-emitting layer that can emit light spontaneously and the light-receiving layer on which the optical sensors are arranged are formed on each of opposite surfaces of the sheet-like substrate.

Preferably, the optical sensors are arranged in a matrix form on the light-emitting layer.

Preferably, the sheet-like substrate is flexible.

Preferably, the image reading device comprises a take-up part around which the reader part is wound such that the reader part can be drawn out.

To attain the above object, in a second aspect of the present invention, there is provided an image forming apparatus comprising the image reading device according to the first aspect of the present invention.

According to the present invention, it is possible to enhance productivity in reading bound originals, such as a book, a magazine, or a document.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the present invention and, together with the description, serve to explain the principles of the present invention.

DETAILED DESCRIPTION OF THE PREFERRED EMBODIMENTS

A preferred embodiment of the present invention will be described in detail below with reference to the drawings.

Figure 1:
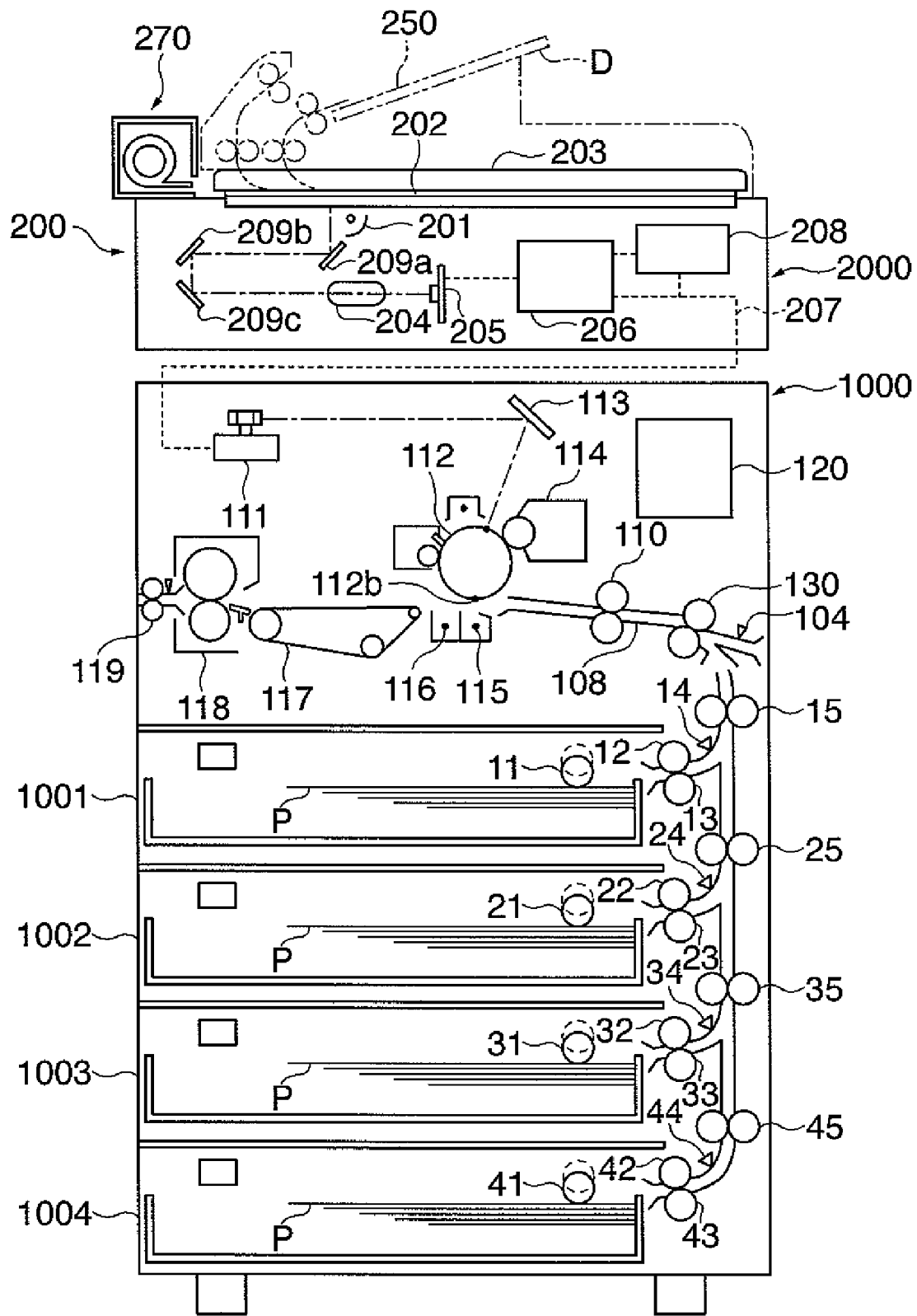
FIG. 1 is a longitudinal cross-sectional view of an image forming apparatus including an image reading device according to the embodiment of the present invention.

FIG. 1 is a longitudinal cross-sectional view of an image forming apparatus including an image reading device according to the embodiment of the present invention.

As shown in FIG. 1, the image forming apparatus is comprised of an image reading unit 2000 that reads an image on an original, and a printer unit 1000 that forms image information read by the image reading unit 2000 on a sheet.

The image reading unit 2000 is comprised of a scanner unit 200 and a sheet-scanner device 270. The image reading unit 2000 is configured such that an automatic original feeder 250 that automatically feeds an original D can be attached thereto as required. The details of the sheet-scanner device 270 will be described hereinafter.

The scanner unit 200 is comprised of a platen 202 on which the original D is placed, and a presser plate 203 that presses the original D placed on the platen 202 against the platen 202 for intimate contact therewith. The original D placed on the platen 202 is illuminated by a lamp 201, and reflected light from the original D is guided to a lens 204 by mirrors 209a, 209b, and 209c. The light incident on the lens 204 forms an optical image on an image sensor 205 implemented e.g. by a CCD. The image sensor 205 converts the optical image into an electric signal and then outputs the signal.

The lamp 201 and the mirrors 209a, 209b, and 209c are integrally formed as a scanner unit movable relative to the original D in the sub scanning direction. In accordance with the movement of this scanner unit in the sub scanning direction, the surface of the original D is scanned, whereby the original D is read by the image sensor 205.

The electric signal output from the image sensor 205 is input to an image processing section 206. The image processing section 206 converts the input electric signal into a digital signal, and performs various kinds of processing on the digital signal. The digital signal having undergone the various kinds of processing is output as image data to the printer unit 1000 via a control line 207. The image processing section 206 is connected to a control section 208. The control section 208 controls not only the overall operation of the image reading unit 2000 including the image processing section 206, but also the operation of the printer unit 1000.

The automatic original feeder 250 is mounted on the image reading unit 2000 after the presser plate 203 is removed from the image reading unit 2000. The automatic original feeder 250 is configured to be capable of being opened/closed for the scanner unit 200. An original can be placed on the platen 202 of the scanner unit 200 by holding the automatic original feeder 250 up from the scanner unit 200. In this case, the original placed on the platen 202 is read in the procedure described above.

When the automatic original feeder 250 is mounted, moving original reading is enabled for reading an original while conveying the same. In the moving original reading, the scanner unit 200 is held in stoppage at a predetermined position (moving original reading position). Then, an original D is fed by the automatic original feeder 250 and conveyed in the sub scanning direction. The original D is scanned in the main scanning direction by the scanner unit 200 while passing through the moving original reading position. Reading from the surface of the original D is thus performed.

The printer unit 1000 includes a laser unit 111 that modulates a laser beam based on image data input from the image reading unit 2000, and then outputs the modulated laser beam in a scanning fashion. The laser beam output from the laser unit 111 is irradiated onto a photosensitive drum 112 via a mirror 113, whereby an electrostatic latent image is formed on the photosensitive drum 112. The electrostatic latent image is visualized as a toner image by toner supplied from a developing device 114. The toner image on the photosensitive drum 112 is transferred by a transfer device 115 onto a sheet P fed by one of cassettes 1001 to 1004 and stopped at a transfer position 112b. The sheet P having the toner image transferred thereon is separated from the photosensitive drum 112 by a separator 116.

Then, the sheet P is conveyed to a fixing device 118 by a conveyor belt 117. The fixing device 118 heats and presses the sheet P to thereby fix the toner image on the sheet P. The sheet P having passed through the fixing device 118 is discharged out of the unit by a discharge roller pair 119.

The cassettes 1001 to 1004 are provided with respective pickup rollers 11, 21, 31, and 41 each for drawing out a sheet P contained therein. A sheet P drawn out from the cassette 1001 is conveyed toward a registration roller pair 110 by a pair of feed rollers 12 and 13 and conveying roller pairs 15 and 130. The sheet P is temporarily stopped by the registration roller pair 110, and then sent to the transfer position 112b in predetermined timing. A sheet P drawn out from the cassette 1002 is conveyed toward the registration roller pair 110 by a pair of feed rollers 22 and 23, a conveying roller pair 25, and the conveying roller pair 130. A sheet P drawn out from the cassette 1003 is conveyed toward the registration roller pair 110 by a pair of feed rollers 32 and 33, a conveying roller pair 35, and the conveying roller pairs 25, 15, and 130. A sheet P drawn out from the cassette 1004 is conveyed toward the registration roller pair 110 by a pair of feed rollers 42 and 43, a conveying roller pair 45, and the conveying roller pairs 35, 25, 15, and 130.

The printer unit 1000 incorporates an engine controller 120 for controlling the operation of the printer unit 1000 based on control commands from the control section 208.

Figure 2:
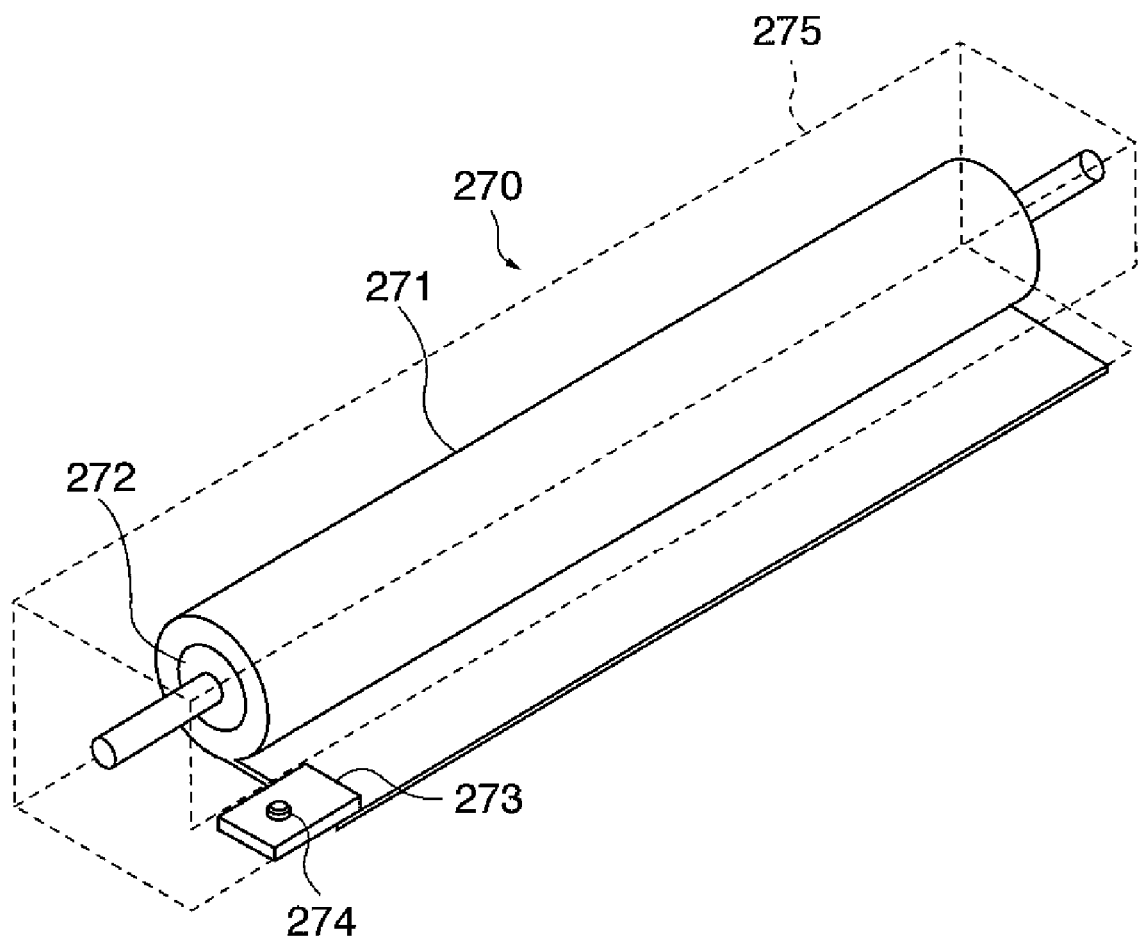
FIG. 2 is a perspective view of essential parts of a sheet-scanner device appearing in FIG. 1.
Figure 3A:
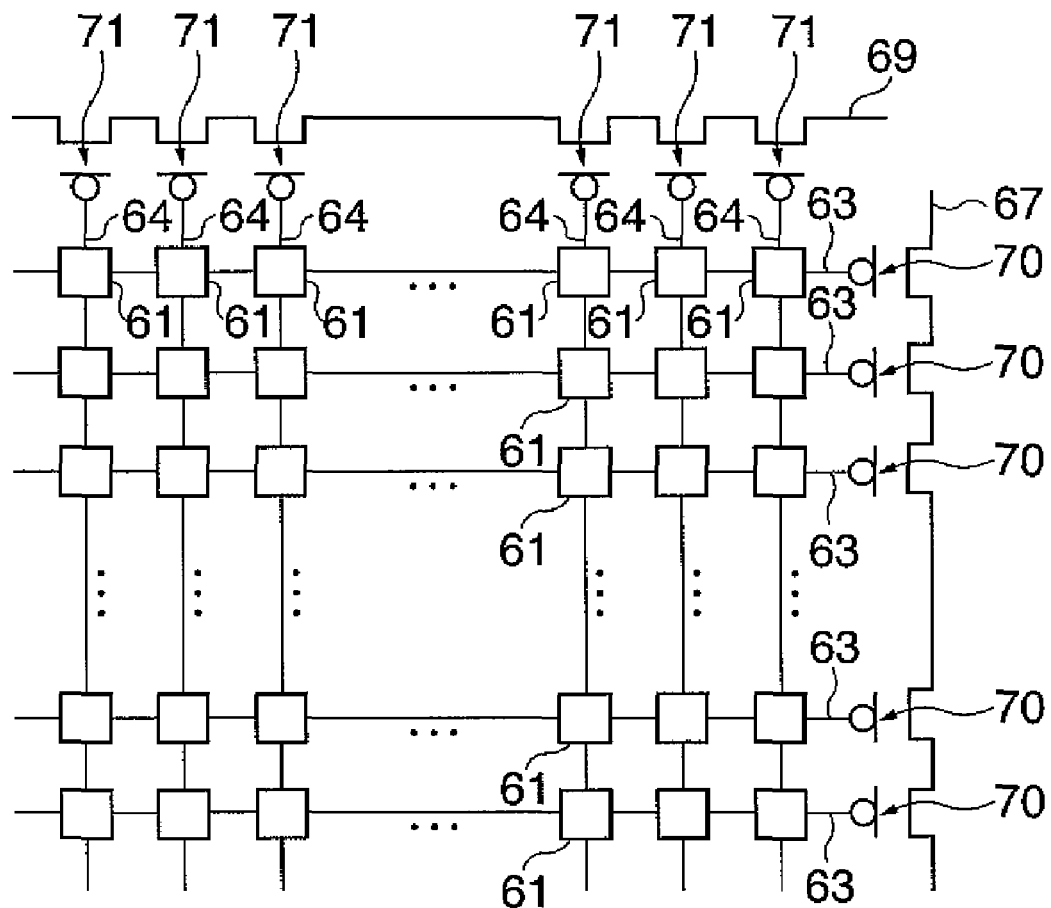
FIG. 3A is a plan view schematically showing a matrix of reading pixels arranged on a sheet scanner appearing in FIG. 2.
Figure 3B:
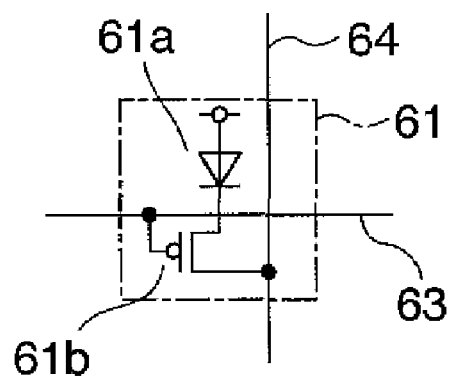
FIG. 3B is a diagram of a circuit configuration of the reading pixel.
Figure 4:
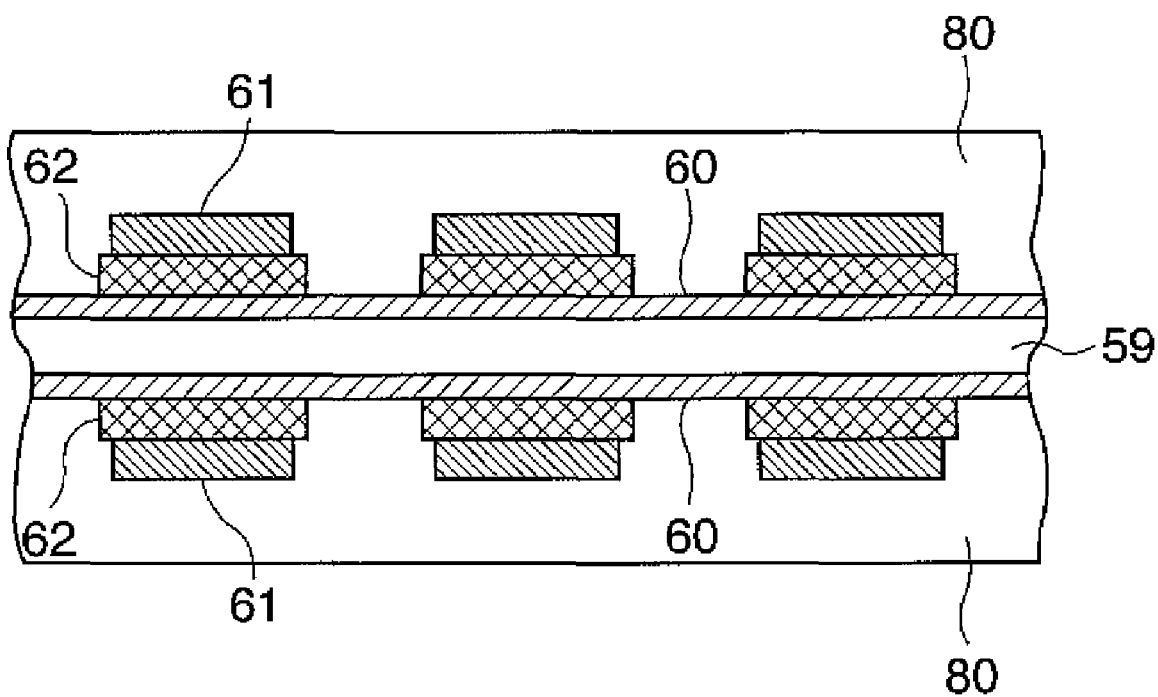
FIG. 4 is a cross-sectional view of the sheet scanner in FIG. 2 taken in the direction of thickness thereof.
Figure 5:
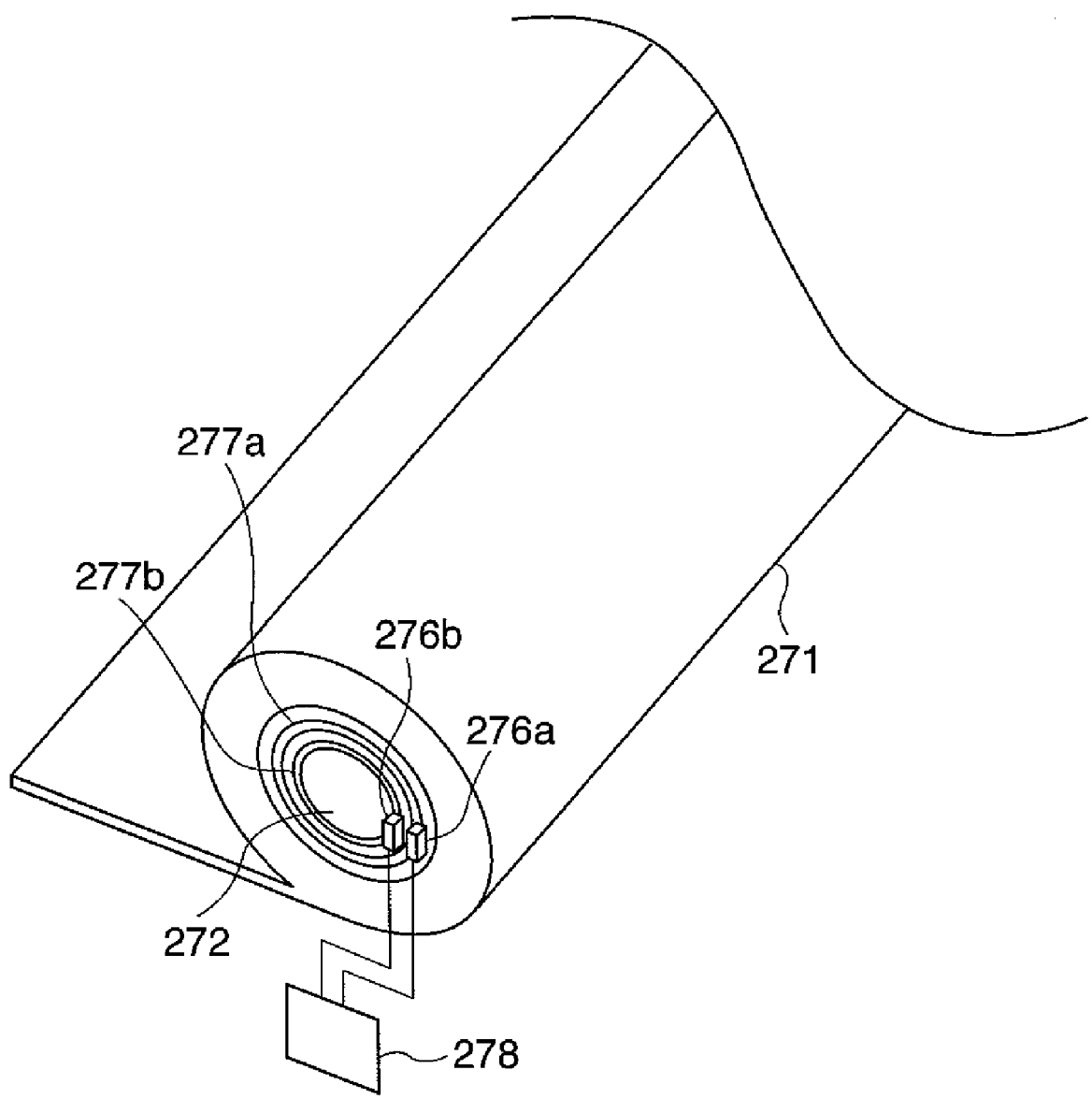
FIG. 5 is a schematic perspective view of the sheet scanner in FIG. 2 with an image processing part connected thereto.

Next, the construction of the sheet-scanner device 270 will be described with reference to FIGS. 2 to 5. FIG. 2 is a perspective view of the essential parts of the sheet-scanner device 270 appearing in FIG. 1. FIG. 3A is a plan view schematically showing the matrix of reading pixels arranged on a sheet scanner 271 appearing in FIG. 2, and FIG. 3B is a diagram of a circuit configuration of the reading pixel. FIG. 4 is a cross-sectional view of the sheet scanner 271 taken in the direction of thickness thereof. FIG. 5 is a schematic perspective view of the sheet scanner 271 with an image processing part 278 connected thereto.

As shown in FIG. 2, the sheet-scanner device 270 has a housing 275 in which a take-up part 272 is contained. The take-up part 272 is rotatably supported in the housing 275, and the sheet scanner 271 is wound around the take-up part 272 such that the sheet scanner 271 can be drawn out. The sheet scanner 271 has one end thereof fixedly joined to the take-up part 272. The other end of the sheet scanner 271 is provided with a handle 273 on which a switch 274 is mounted. The handle 273 is used for drawing out the sheet scanner 271. The switch 274 is used for giving an instruction to start a reading operation.

As shown in FIG. 4, the sheet scanner 271 has a sheet-like substrate 59. The substrate 59 is formed by a flexible member having a very small light transmittance. The substrate 59 has surfaces thereof formed thereon with respective light-emitting layers 60 each of which emits light spontaneously. On each of the light-emitting layers 60, there are arranged a plurality of reading pixels 61. Between each of the reading pixels 61 and the associated light-emitting layer 60, there is provided a light-shielding film 62. The light-shielding film 62 prevents light from the light-emitting layer 60 from directly entering the reading pixel 61. Further, on each of the surfaces of the substrate 59, there is formed a protective layer 80 for protecting the light-emitting layers 60 and the reading pixels 61.

Each of the surfaces of the substrate 59 has an area defined for acting as a reader part, and the reading pixels 61 are arranged in this area. The reader part area extends from the end (end toward the handle 273) of the sheet scanner 271 in the longitudinal direction, with a predetermined width. A readable original size is determined according to the size (length and width) of the reader part area.

As shown in FIG. 3A, the reading pixels 61 in the reader part area on each of the surfaces of the substrate 59 of the sheet scanner 271 are arranged in the form of a matrix. Reading pixels 61 arranged in the column direction of the matrix are connected to an associated word line 63, and each word line 63 is connected to a column-decoder line 67 via an associated wordline selector 70. On the other side, reading pixels 61 arranged in the row direction of the matrix are connected to an associated bit line 64, and each bit line 64 is connected to a row-decoder line 69 via an associated bitline selector 71. The current value of a certain reading pixel 61 is read out following address designation by the decoder lines 67 and 69.

As shown in FIG. 3B, each reading pixel 61 is comprised of an organic photodiode 61a that is operable when receiving light, to generate an electric current with a value corresponding to the amount of the received light, and an organic transistor 61b. The value of the electric current generated by the organic photodiode 61a is read out by switching the organic transistor 61b. The organic photodiode 61a and the organic transistor 61b are organic semiconductors.

As shown in FIG. 5, the take-up part 272 has terminals 277a and 277b disposed at one end thereof. The terminal 277a is connected to the row-decoder line 69, while the terminal 277b is connected to the column-decoder line 67. Connected to the terminals 277a and 277b are associated terminals 276a and 276b, respectively. Each of the terminals 276a and 276b forms a spring contact point slidably held in contact with an associated one of the terminals 277a and 277b. The terminals 276a and 276b are connected to the image processing part 278. With this arrangement, even when the take-up part 272 rotates, the row-decoder line 69 and the column-decoder line 67 are held in contact with the image processing part 278.

Figure 6:
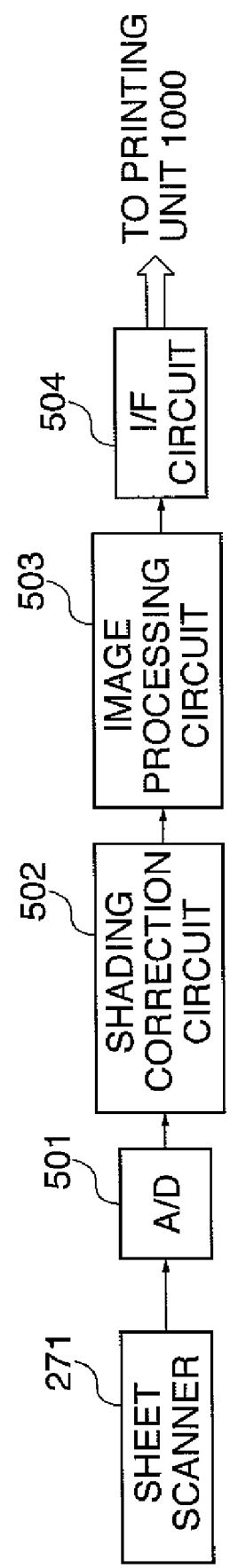
FIG. 6 is a block diagram of the image processing part appearing in FIG. 5.

Next, the image processing part 278 will be described with reference to FIG. 6. FIG. 6 is a block diagram of the image processing part 278.

As shown in FIG. 6, the image processing part 278 includes an A/D converter 501 that converts an image signal output from the sheet scanner 271 into a digital image signal. The digital image signal output from the A/D converter 501 is input to a shading correction circuit 502. The shading correction circuit 502 performs shading correction on the input digital image signal. The image signal having undergone the shading correction is input to an image processing circuit 503. The image processing circuit 503 carries out predetermined image processing on the input image signal and then delivers the image signal as image data to the printer unit 1000 (laser unit 111) via an I/F circuit 504. The image processing part 278 is controlled by the control section 208.

Shading data for use in shading correction by the shading correction circuit 502 is obtained by reading a reference member provided in advance, using the sheet scanner 271. Examples of a method of obtaining the shading data include a method of reading from reference members that can cover the respective upper and lower surfaces of the sheet scanner 271, by holding the reference members in intimate contact with the surfaces, respectively. In this method, the light-emitting layer 60 on the associated surface of the sheet scanner 271 held in intimate contact with the reference member emits light spontaneously, and the light emitted from the light-emitting layer 60 passes between the reading pixels 61 to illuminate the reference member. Then, reflected light from the illuminated reference member is received by the reading pixels 61, and each of the reading pixels 61 generates an electric current having a value corresponding to the amount of the received light. Shading data is obtained by reading out the values of the electric currents generated by the respective reading pixels 61.

Figure 7:
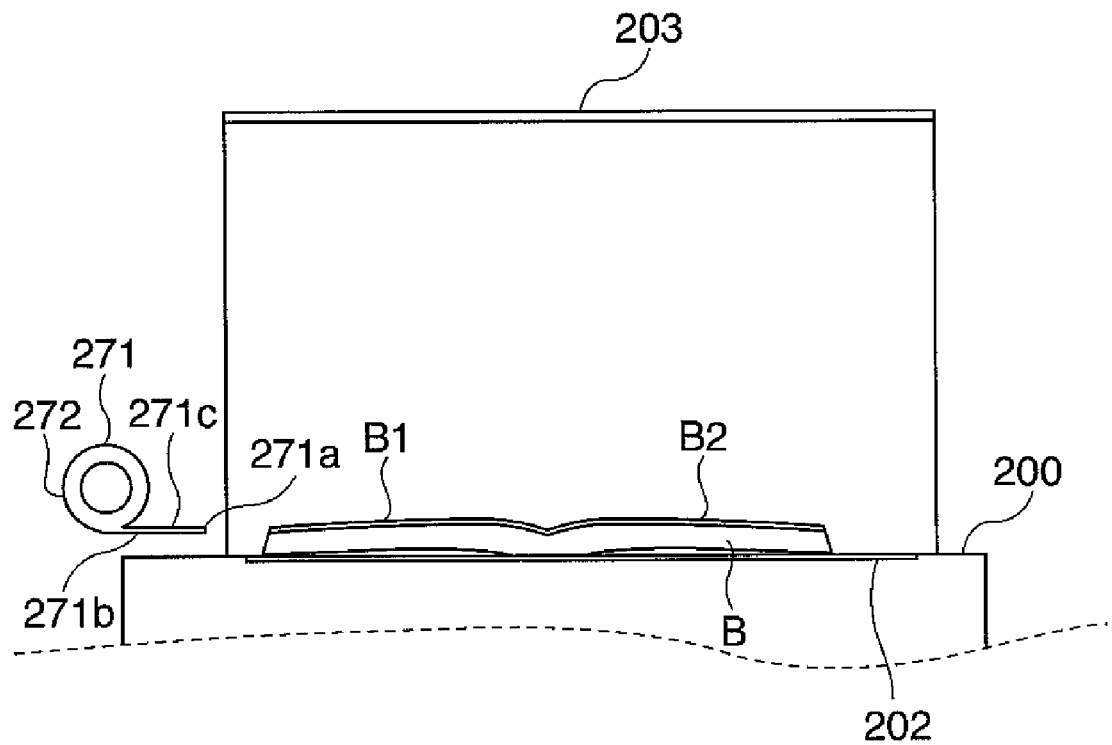
FIG. 7 is a schematic view which is useful for explaining an operating state of the sheet scanner in reading a book-type original.
Figure 8:
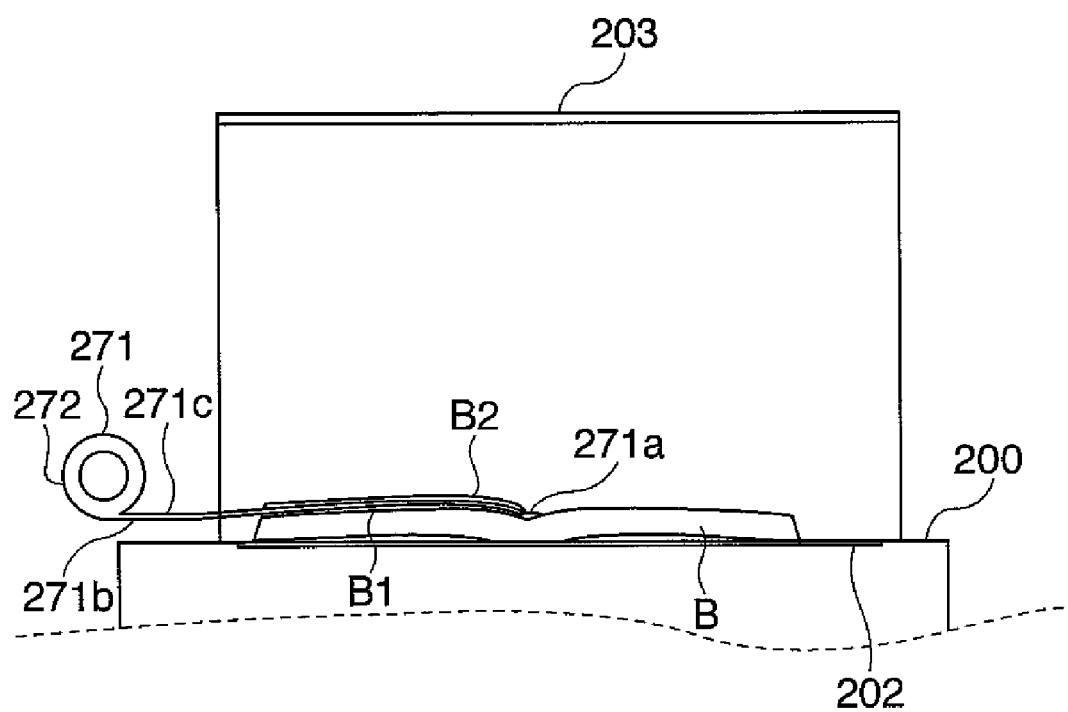
FIG. 8 is a schematic view which is useful for explaining another operating state of the sheet scanner in reading of the book-type original.
Figure 9:
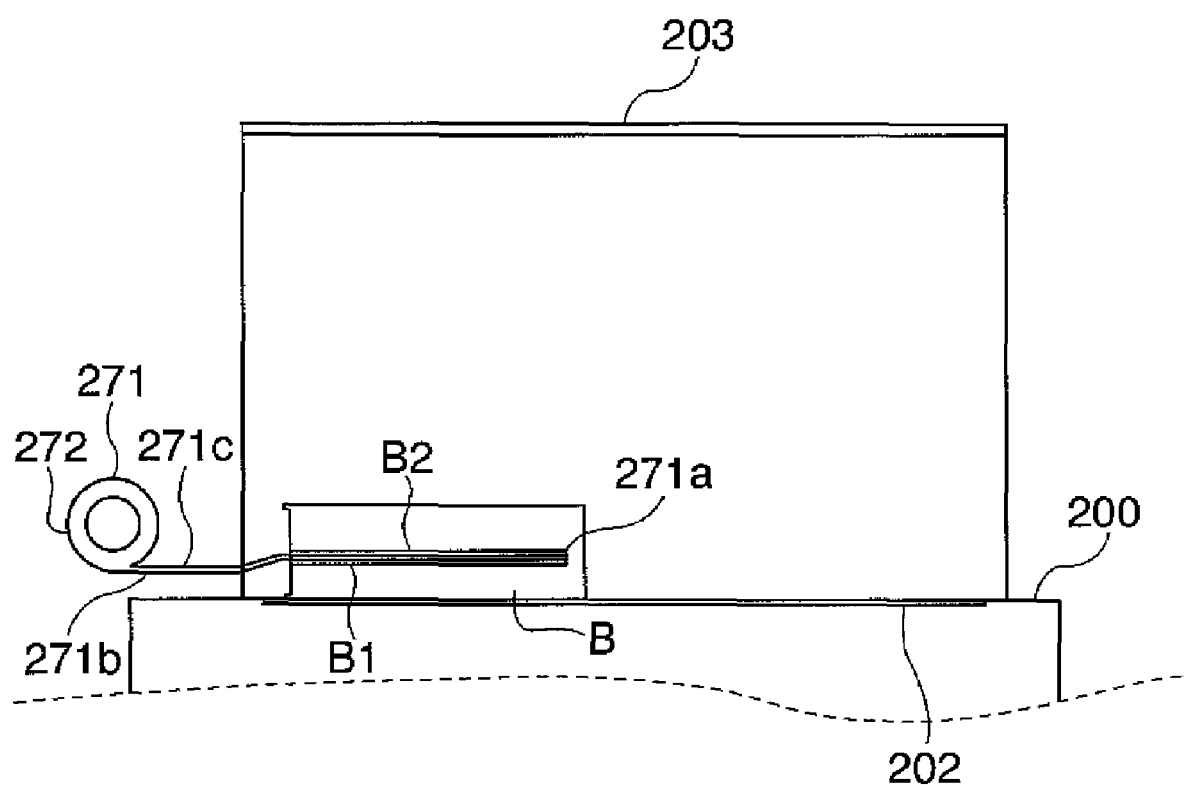
FIG. 9 is a schematic view which is useful for explaining still another operating state of the sheet scanner in reading the book-type original.

Next, a procedure of reading a book-type original will be described with reference to FIGS. 7 to 9. FIGS. 7 to 9 are schematic views useful in explaining the sequence of operations of the sheet scanner 271 for reading the book-type original. Here, it is assumed that the automatic original feeder 250 is not mounted, and the presser plate 203 is not removed.

In the present embodiment, one of a double-sided reading mode and a single-sided reading mode can be set as a mode for reading by the sheet-scanner device 270. In the double-sided reading mode, two pages of a book-type original are read in a state held in intimate contact with the respective opposite surfaces of the sheet scanner 271. In the single-sided reading mode, an original is read in a state held in intimate contact with one surface of the sheet scanner 271. Each of the reading modes is set in response to operation performed via an operating section, not shown.

In the case of reading desired pages of a book-type original B, first, a user places the book-type original B on the platen 202, with its reading target pages B1 and B2 spread face-up, as shown in FIG. 7. At this time, the presser plate 203 is held open. Further, the sheet scanner 271 is contained in the sheet-scanner device 270 in a state wound around the take-up part 272.

Next, the user draws out the sheet scanner 271 while holding the handle 273. Then, as shown in FIG. 8, the sheet scanner 271 is drawn out until its leading end 271a reaches the boundary between the pages B1 and B2 of the book-type original B. At this time, the page B1 is covered by a lower surface 271b of the sheet scanner 271.

Next, the book-type original B is closed such that the page B2 is covered by an upper surface 271c of the sheet scanner 271. As a consequence, a part of the reader part area of the sheet scanner 271 is sandwiched between the pages B1 and B2 of the book-type original B, as shown in FIG. 9. In this state, since the sheet scanner 271 is flexible, the surfaces 271b and 271c of the sheet scanner 271 are held in intimate contact with the respective pages B1 and B2 facing the surfaces 271b and 271c, respectively. Then, when the switch 274 attached to the handle 273 is pressed, an instruction for starting a reading operation is given. It is assumed here that the double-sided reading mode is set. In this case, image information on the page B1 and image information on the page B2 are read by respective reader part areas of the sheet scanner 271 sandwiched by the book-type original B.

In the reader part area on the lower surface 271b of the sheet scanner 271 sandwiched by the book-type original B, the associated light-emitting layer 60 emits light spontaneously, and the light emitted from the light-emitting layer 60 passes between associated reading pixels 61 to illuminate the page B1. As a result, reflected light from the illuminated page B1 is received by the reading pixels 61, and each of the reading pixels 61 generates an electric current having a value corresponding to the amount of the received light. The values of the electric currents generated by the respective reading pixels 61 are read as an image signal, and the image signal is input to the image processing part 278.

Similarly, light emitted from the light-emitting layer 60 on the upper surface 271c passes between associated reading pixels 61 to illuminate the page B2. As a result, reflected light from the illuminated page B2 is received by the reading pixels 61, and each of the reading pixels 61 generates an electric current having a value corresponding to the amount of the received light. The values of the electric currents generated by the respective reading pixels 61 are read as an image signal, and the image signal is input to the image processing part 278.

Thus, the spread pages B1 and B2 of the book-type original B are each read as one page by the sheet scanner 271.

On the other hand, when the single-sided reading mode is set instead of the double-sided reading mode, one of the pages B1 and B2 of the book-type original B is read.

When a next page is to be read, the sheet scanner 271 is temporarily drawn out from the book-type original B, and the book-type original B is opened again to the next page. Then, the sheet scanner 271 is sandwiched between the next page and a page immediately following the next page, whereby the two pages can be read.

Pages of the book-type original B can be sequentially read by repeatedly carrying out the above-described operation.

The pages B1 and B2 can also be read as a single page. In this case, the reading mode of the sheet-scanner device 270 is switched to the single-sided reading mode, and the sheet scanner 271 is drawn out to a position for covering both the page B1 and the page B2. Therefore, the lower surface 271c of the sheet scanner 271 is brought into a state covering the pages B1 and B2. At this time, since the sheet scanner 271 is flexible, the lower surface 271c can be held in intimate contact with the entire pages B1 and B2 including respective portions thereof close to the book center of the book-type original B. Then, when the switch 274 is pressed, the pages B1 and B2 are read as a single page by the reading pixels on the lower surface 271c of the sheet scanner 271.

The lower surface 271c of the sheet scanner 271 can be thus held in intimate contact with the pages B1 and B2, which makes it possible to reliably and accurately read images on the respective pages B1 and B2. Further, since the lower surface 271c can be held in intimate contact with the pages B1 and B2 even at the respective portions close to the book center, it is possible to reliably and accurately read even an image portion close to the book center.

The sheet scanner 271 may be sandwiched between the pages B1 and B2 e.g. by inserting the same into a space formed between the pages by slightly opening the book-type original B from its closed state.

As described above, according to the embodiment of the present invention, it is possible to read a desired page of a book-type original by the simple operation, thereby enhancing productivity in reading the book-type original.

Further, since the sheet-scanner device 270 can contain the sheet scanner 271 in a state wound around the take-up part 272, space for setting the sheet-scanner device 270 can be limited, and hence it is possible to prevent the image reading unit 2000 from being increased in size.

Although in the present embodiment, the light-emitting layer and the reading pixels are provided on each of the opposite surfaces of the sheet scanner for reading in the double-sided reading mode, the image reading device may be configured to be capable of reading in the single-sided reading mode alone, by providing a light-emitting layer and reading pixels only on one surface of the sheet scanner.

The above-described embodiments are merely exemplary of the present invention, and are not be construed to limit the scope of the present invention.

The scope of the present invention is defined by the scope of the appended claims, and is not limited to only the specific descriptions in this specification. Furthermore, all modifications and changes belonging to equivalents of the claims are considered to fall within the scope of the present invention.

This application claims the benefit of Japanese Patent Application No. 2005-376415 filed Dec. 27, 2005, which is hereby incorporated by reference herein in its entirety.

What is claimed is:

1. An image reading device having a reader part for reading an image on an original, wherein said reader part comprises:
   a substrate formed thereon with a light-emitting layer that emits light, and a light-receiving layer on which a plurality of optical sensors are arranged,
   wherein said reader part is mounted in the image reading device such that said reader part is woundable for stowing.

2. An image reading device as claimed in claim 1, wherein the light-emitting layer that emits light and the light-receiving layer on which the optical sensors are arranged are formed on each of opposite surfaces of the substrate.

3. An image reading device as claimed in claim 2, wherein the optical sensors are arranged in a matrix form on the light-emitting layer.

4. An image reading device as claimed in claim 1, wherein the substrate is flexible.

5. An image forming apparatus comprising the image reading device as claimed in any one of claims 1 to 4.

6. An image forming apparatus as claimed in claim 1, wherein the reader part is pullable out from the stowed position so that the reader part is substantially planar.

7. An image reading device comprising:
   a reader part for reading an image on an original; and
   a take-up part around which said reader part is wound such that said reader part is drawnable outwardly,
   wherein said reader part comprises a sheet-like substrate formed thereon with a light-emitting layer that emits light, and a light-receiving layer on which a plurality of optical sensors are arranged, said reader part being mounted in the image reading device such that said reader part is movable to and from the original.

8. An image forming apparatus comprising the image reading device as claimed in claim 7.

* * * * *